(12) United States Patent
Cimatti et al.

(10) Patent No.: US 8,364,360 B2
(45) Date of Patent: *Jan. 29, 2013

(54) MOTOR VEHICLE WITH INSERTABLE FOUR-WHEEL DRIVE

(75) Inventors: Franco Cimatti, Pavullo (IT); Rudolf Morawetz, S. Caterina-Brunico (IT)

(73) Assignee: Ferrari S.p.A., Modena (IT)

( * ) Notice: Subject to any disclaimer, the term of this patent is extended or adjusted under 35 U.S.C. 154(b) by 805 days.

This patent is subject to a terminal disclaimer.

(21) Appl. No.: 11/909,669

(22) PCT Filed: Mar. 24, 2006

(86) PCT No.: PCT/IB2006/000672

§ 371 (c)(1),
(2), (4) Date: Jun. 4, 2009

(87) PCT Pub. No.: WO2006/100585

PCT Pub. Date: Sep. 28, 2006

(65) Prior Publication Data

US 2011/0087410 A1  Apr. 14, 2011

(30) Foreign Application Priority Data

Mar. 25, 2005  (IT) .............................. BO2005A0195

(51) Int. Cl.
*G06F 7/00* (2006.01)

(52) U.S. Cl. .............. 701/60; 700/1; 180/197; 180/233; 180/247; 180/249; 192/38; 192/56.6; 192/72; 56/1; 74/665 T; 307/147; 310/162; 475/284; 477/109; 464/93

(58) Field of Classification Search ...... 701/1; 180/197, 180/233, 247, 249; 192/38, 56.6, 72; 56/1; 74/665 T; 307/147; 310/162; 475/284; 477/109; 464/93

See application file for complete search history.

(56) References Cited

U.S. PATENT DOCUMENTS

| 3,361,222 A | * | 1/1968 | Salisbury | 180/247 |
| 3,545,307 A | * | 12/1970 | Bildat | 477/109 |
| 4,726,254 A | * | 2/1988 | Kubo et al. | 74/665 T |
| 4,754,834 A | | 7/1988 | Ozaki et al. | |
| 4,874,056 A | | 10/1989 | Naito | |
| 5,332,059 A | | 7/1994 | Shirakawa et al. | |

(Continued)

FOREIGN PATENT DOCUMENTS

| EP | 1 403 124 | 3/2004 |
| FR | 2 686 296 | 7/1993 |

(Continued)

*Primary Examiner* — James Trammell
*Assistant Examiner* — Sanjeev Malhotra
(74) *Attorney, Agent, or Firm* — Oblon, Spivak, McClelland, Maier & Neustadt, L.L.P.

(57) ABSTRACT

A motor vehicle with insertable four-wheel drive, including an engine having a crankshaft, a pair of main driving wheels constantly connected to the crankshaft by interposition of a gearbox provided with a first clutch, and a pair of secondary driving wheels, which may be connected to the crankshaft by an insertable transmission system. The insertable transmission system presents a second clutch, which is connected on one end with a fixed transmission ratio to the crankshaft upstream of the gearbox and on the other end with a fixed transmission ratio to the secondary driving wheels. A percentage of motive torque to be transmitted to the secondary driving wheels by the second clutch is determined according to dynamic parameters of the motor vehicle detected by respective sensors.

37 Claims, 6 Drawing Sheets

U.S. PATENT DOCUMENTS

| | | | |
|---|---|---|---|
| 5,610,454 A * | 3/1997 | Nishikawa et al. | 307/147 |
| 6,604,346 B1 * | 8/2003 | Martignon | 56/1 |
| 2001/0008192 A1 * | 7/2001 | Morisawa | 180/197 |
| 2001/0042652 A1 * | 11/2001 | Watson et al. | 180/249 |
| 2002/0029948 A1 * | 3/2002 | Williams | 192/72 |
| 2002/0125097 A1 * | 9/2002 | Ochab et al. | 192/38 |
| 2003/0029688 A1 * | 2/2003 | Lovatt | 192/56.6 |
| 2003/0050123 A1 * | 3/2003 | Kuczera | 464/93 |
| 2003/0141127 A1 * | 7/2003 | Kobayashi | 180/233 |
| 2004/0035622 A1 * | 2/2004 | Ito et al. | 180/197 |
| 2005/0240319 A1 * | 10/2005 | Sawada | 701/1 |
| 2006/0058149 A1 * | 3/2006 | Janson et al. | 475/284 |
| 2006/0202582 A1 * | 9/2006 | Umesaki et al. | 310/162 |
| 2007/0221427 A1 | 9/2007 | Cimatti et al. | |

FOREIGN PATENT DOCUMENTS

| | | |
|---|---|---|
| GB | 493 417 | 10/1938 |
| WO | 2005 080117 | 9/2005 |

* cited by examiner

MOTOR VEHICLE WITH INSERTABLE FOUR-WHEEL DRIVE

TECHNICAL FIELD

The present invention relates to a motor vehicle with insertable four-wheel drive.

The present invention finds advantageous application in a sporty, high-performance cars, to which explicit reference will be made in the description below without for this loosing in generality.

BACKGROUND ART

Currently, a sporty, high-performance car presents a rear-wheel drive and is provided with a self-locking differential aiming at maximising motive torque transmitted by the rear wheels to the road surface in all conditions.

Rear-wheel drive with self-locking differential is a premium for sporty driving in either optimal grip conditions (dry road) or reasonable grip conditions (wet road); however, such solution in combination with a high motive torque and large-sized tyres entails very difficult and potentially dangerous driving in poor grip conditions (flooded or icy road).

The use of permanent or insertable four-wheel drive has been proposed in order to improve the driveability of a sporty car in poor grip conditions.

Permanent four-wheel drive allows to considerably improve the behaviour of the motor vehicle in poor grip conditions, but presents the drawback of increasing loss of torque in the transmission system and conferring to the car a behaviour in optimal grip conditions which is not always appreciated by drivers.

Insertable four-wheel drive allows the motor vehicle driver to decide whether to use rear-wheel drive or four-wheel drive; in this way, the driver may use rear-wheel drive in optimal grip conditions and four-wheel drive in poor grip conditions. However, insertable four-wheel drive is complex and costly to manufacture; furthermore, the driver may not realise the presence of sheets of ice on the road and may not therefore engage four-wheel drive in a timely fashion.

Patent application IT20043000068 describes an insertable four-wheel drive motor vehicle, which is provided with an engine having a crankshaft, a pair of main driving wheels constantly connected to the crankshaft by interposition of a gearbox provided with a first clutch, and a pair of secondary driving wheels, which may be selectively connected to the crankshaft by means of an insertable transmission system; the insertable transmission system presents a second clutch, which on one end is connected with fixed transmission ratio to the crankshaft upstream of the gearbox and on the other is connected with fixed transmission ratio to the secondary driving wheels. The insertable transmission system transfers the motive torque to the front wheels when a difference between the rotation speed of the front wheels and the rotation speed of the rear wheels occurs, i.e. essentially when the rear wheels slip. Such control strategy may satisfactorily solve the problems of traction control, but has been demonstrated totally unsuitable for intervening also on the stability of the car.

DISCLOSURE OF INVENTION

It is the object of the present invention to make an insertable four-wheel drive motor vehicle, which is easy and cost-effective to implement, free from the drawbacks described above and at the same time allows to increase performance, stability and traction control in all grip conditions.

According to the present invention, an insertable four-wheel drive motor vehicle as stated in the accompanying claims is made.

BRIEF DESCRIPTION OF THE DRAWINGS

The present invention will now be described with reference to the accompanying drawings illustrating some non-limitative embodiment examples thereof, in which.

BEST MODE FOR CARRYING OUT THE INVENTION

Figure 1:
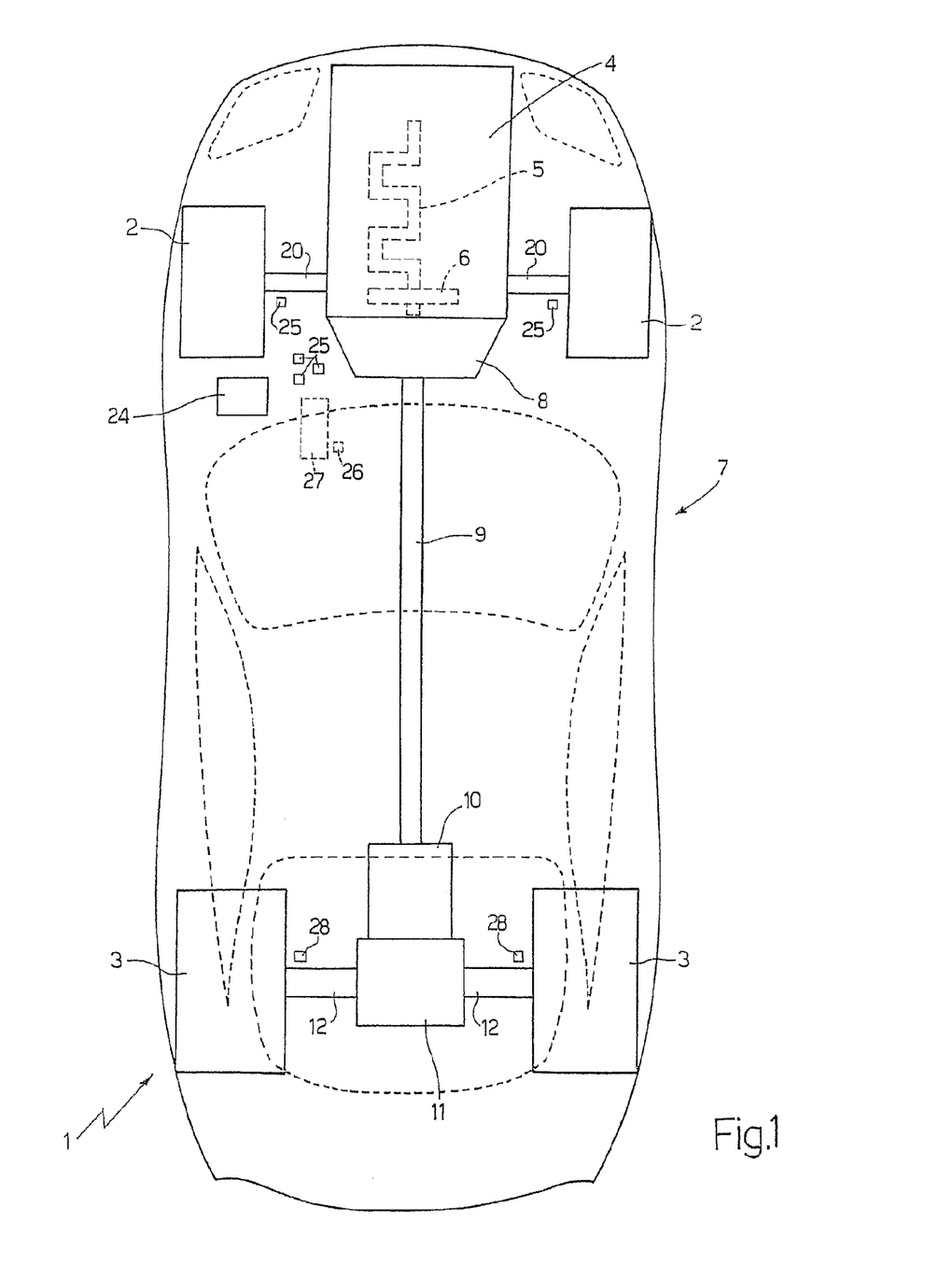
FIG. 1 shows a schematic and plan view of an insertable four-wheel drive motor vehicle made according to the present invention.
Figure 2:
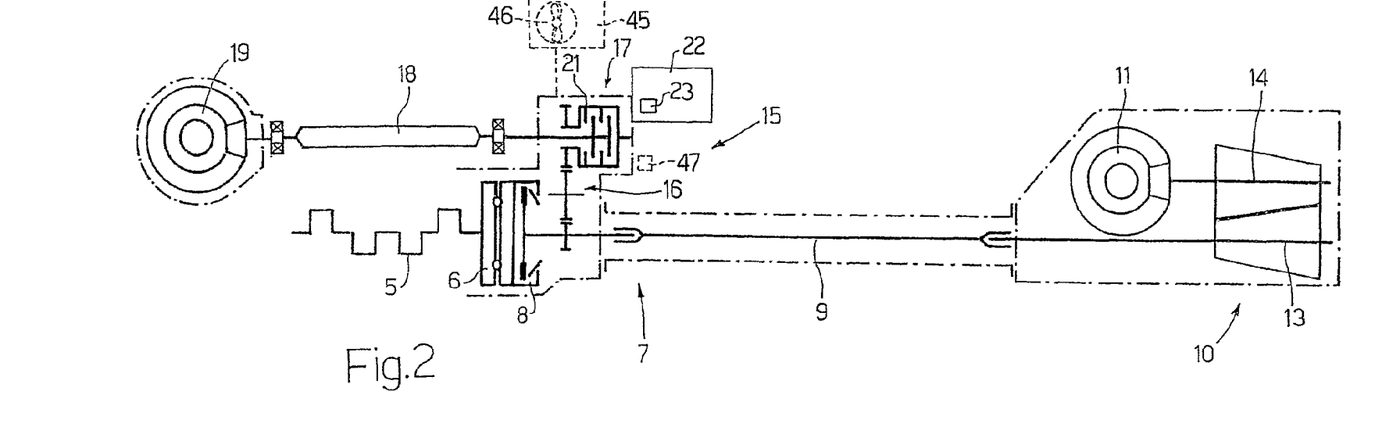
FIG. 2 shows a functional diagram of the transmission of motion to the driving wheels of the motor vehicle in FIG. 1.

In FIG. 1, it is indicated by 1 a motor vehicle provided with two normally driven front wheels 2 and two constantly driving rear wheels 3. The car 1 comprises an internal combustion engine 4, which is arranged in frontal position, and is provided with a crankshaft 5 having a flywheel 6 and is connected to the rear driving wheels 3 by means of a driveline 7. The driveline 7 comprises a dry or wet clutch 8, which is accommodated in a bell integral with the engine 4 and adapted to connect the crankshaft 5 of the engine 4 to a propeller shaft 9 ending with a mechanical gearbox 10 arranged to the rear axle; connected in a cascade with respect to the gearbox 10 is a self-locking rear differential, from which a pair of drive axles 12 depart, each of which is integral with a rear driving wheel 3. As shown in FIG. 2, a primary shaft 13 of the gearbox 10 is integral with the propeller shaft 9, while a secondary gearbox shaft 14 is coupled with the self-locking rear differential 11.

Figure 5:
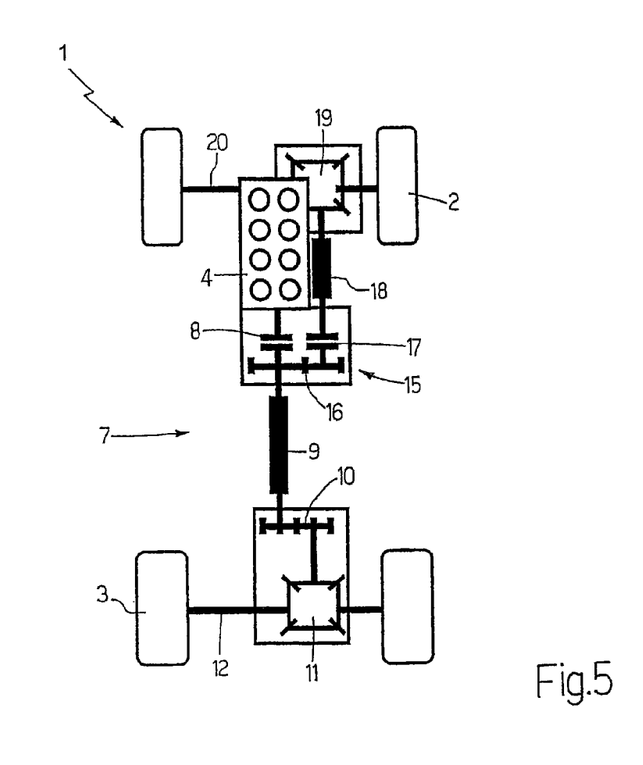
FIG. 5 shows a different graphic representation of the functional diagram of transmission of motion to the driving wheels in FIG. 2.

As shown in FIGS. 1, 2 and 5, the motor vehicle 1 comprises an insertable transmission system 15, which is adapted to mechanically connect the crankshaft 5 to the front wheels 2 so as to turn the front wheels 2 into driving wheels themselves. The insertable transmission system 15 comprises a gear chain 16, which is arranged immediately downstream of the clutch 8, presents a constant transmission ratio and is adapted to transmit motion from the crankshaft 5 to the input of a wet clutch 17. The output of clutch 17 is connected with fixed transmission ratio to the front wheels 2 by means of a propeller shaft 18 coupled to a front differential 19 and provided with a pair of drive axles 20.

Clutch 17 is provided with a chamber 21, which accommodates a number of plates integral with the propeller shaft 18 intercalated with an equal number of plates integral with the gear chain 16, and which is filled with oil for lubricating and cooling the plates. Furthermore, the clutch 17 is provided with a hydraulic actuator 22, which adjusts the axial thrust existing between the plates integral with the propeller shaft 18 and the plates integral with the gear chain 16 so as to vary the torque transmitted by the clutch 17 between a minimum null value (corresponding to no thrust) and a maximum value (corresponding to maximum thrust). In particular, the axial thrust exerted by the hydraulic actuator 22 is proportional to a pressure P of the oil within the hydraulic actuator 22 itself; consequently, the motive torque transmitted by the clutch 17 to the propeller shaft 18 is essentially proportional to the pressure P of the oil in the hydraulic actuator 22.

According to a different embodiment (not shown), the actuator 22 is not hydraulic, but electromechanical, i.e. comprises an electrical motor provided with a mechanical transmission.

According to a preferred embodiment, the transmission ratio of the gear chain 16 corresponds exactly to the transmission ratio determined by the third gear of the gearbox 10, and the transmission ratio of the front differential 19 is identical to the transmission ratio of the self-locking rear differential; in this way:

when third gear of the gearbox 10 is engaged, the secondary shaft 14 of the gearbox 10 (linked to the rotation of the rear wheels 3), the output of clutch 17 (linked to the rotation of the front wheels) and the input of clutch 17 present the same angular speed;

when first or second gear is engaged, the secondary shaft 14 of the gearbox 10 and the output of the clutch 17 turn slower than the input of clutch 17; and when a gear higher than third gear is engaged, the secondary shaft 14 of the gearbox 10 and the output of the clutch 17 turn faster than the input of clutch 17.

In order for the clutch 17 to transfer motive torque to the front differential 19 (i.e. to the front wheels 2), the front differential 19, i.e. the output of clutch 17, must be either slower than or have the same speed as the input of clutch 17. If the clutch 17 is closed when the output of clutch 17 turns faster than the input of clutch 17, the clutch 17 would transfer torque from the front differential 19 to the gearbox 10, i.e. towards the rear driving wheels 3, generating a braking of the front wheels 2 and a torque overload on the rear driving wheels 3.

According to a different embodiment, the transmission ratio of the gear chain 16 is different from the transmission ratio determined by the third gear of the gearbox 10 and the transmission ratio of the front differential 19 is different from the transmission ratio of the self-locking rear differential, so that when third gear of the gearbox 10 is engaged, the output of clutch 17 and the input of clutch 17 present the same angular speed. In other words, the transmission ratios of the gear chain 16 and that of the front differential 19 are combined so that when the third gear of the gearbox 10 is engaged, the output of clutch 17 and the input of clutch 17 present the same angular speed.

Obviously, the transmission ratio of the gear chain may be modified and made to coincide with the transmission ratio of any gear other than third gear of the gearbox 10.

In drive conditions, in the range of operation of the clutch 17 (1st-3rd gear), clutch 17 itself is capable of transferring motive torque to the front wheels 2 consequently removing motive torque from the driving rear wheels 3 with respect to the case in which the clutch 17 is open; in these conditions, all four wheels 2 and 3 of the motor vehicle 1 will therefore receive motive torque, as occurs in a traditional four-wheel drive transmission system. In coasting conditions, the torque is shared differently with respect to the torque distribution in a traditional four-wheel drive transmission. In coasting conditions in a car with traditional four-wheel drive, all four wheels of the car feel a braking torque from the engine. In the transmission diagram described above, also during coasting, motive torque is transmitted from the rear driving wheels 3 to the front wheels 2; consequently, during coasting, with respect to the case of clutch 17 open, the front wheels will have a positive motive torque while the rear driving wheels will have a further braking torque equal to the motive torque transmitted to the front wheels 2.

The hydraulic actuator 22 is provided with a proportioning three-way solenoid valve 23, which is capable of maintaining the hydraulic actuator 22 isolated to maintain the pressure P of the oil in the hydraulic actuator 22 constant, is capable of connecting the hydraulic actuator 22 to an oil reservoir (not shown) at ambient pressure for reducing the pressure P of the oil in the hydraulic actuator 22, and is adapted to connect the hydraulic actuator 22 to a pressurised hydraulic accumulator (not shown) in order to increase the pressure P of the oil in the hydraulic actuator 22. It is therefore clear that in order to control the hydraulic actuator 22, it is necessary and sufficient to control the solenoid valve 23 of the hydraulic actuator 22.

Figure 3:
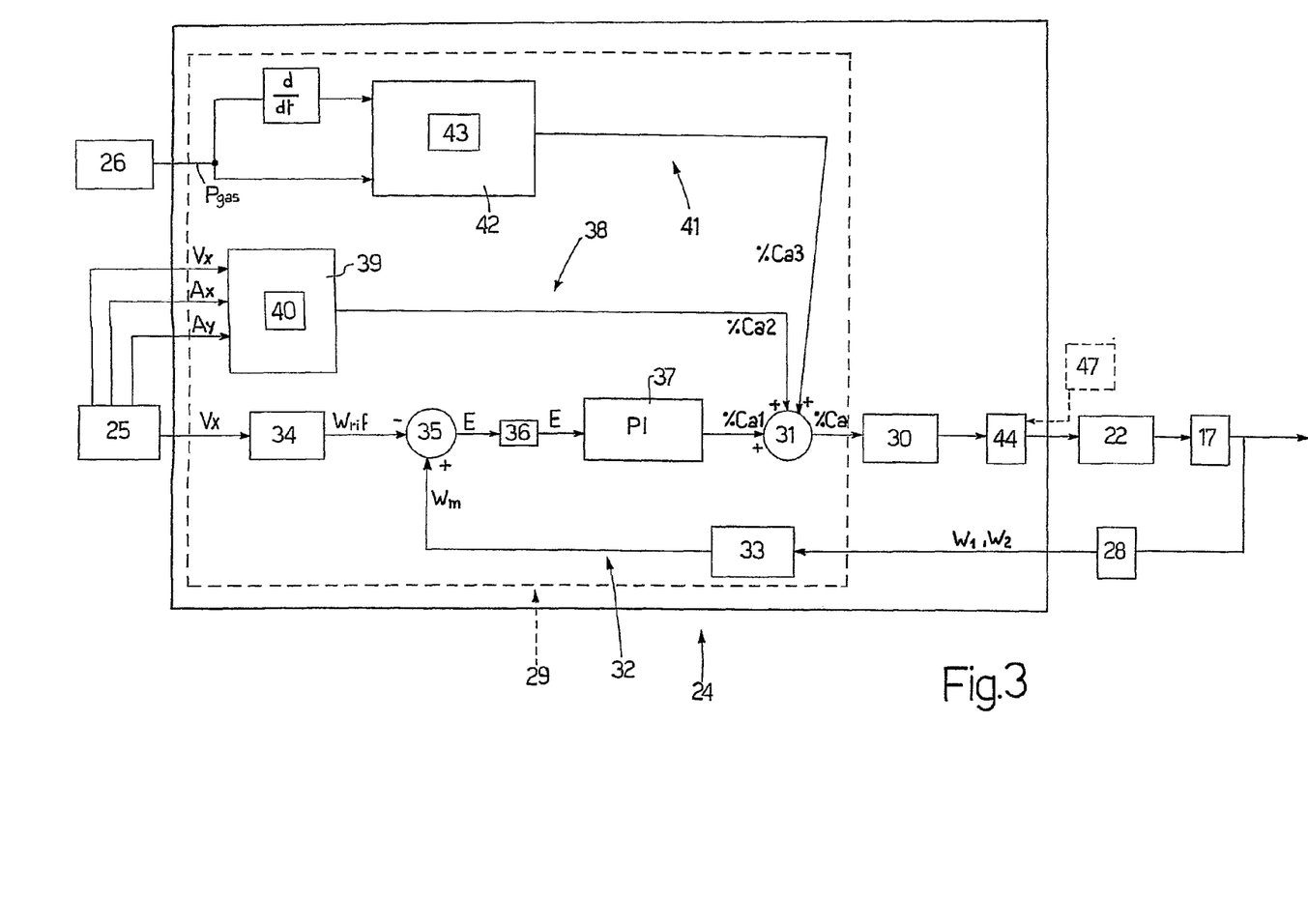
FIG. 3 shows a control diagram implemented by an electronic control unit of the motor vehicle in FIG. 1.

The solenoid valve 23 of the hydraulic actuator 22 is controlled by an electronic control unit 24 (schematically shown in FIG. 1) which operates according to the block diagram in FIG. 3.

A plurality of sensors 25 (of the known type schematically shown in FIG. 1) detect in real time the values of a series of physical quantities of the car 1 which represent the dynamic parameters of the car 1 and send such values to the electronic control unit 24; in particular, the values detected by sensors 25 are longitudinal speed Vx of car 1, longitudinal acceleration Ax of car 1, and transversal acceleration Ay of car 1.

Furthermore, a sensor 26 (schematically shown in FIG. 1) detects in real time a position Pgas of an accelerator pedal 27 (schematically shown in FIG. 1) which is operated by the driver of car 1 to control the output of motive torque by the engine 4. The sensor 26 is connected in a known way to the electronic control unit 24 to communicate the position Pgas of the accelerator pedal 27 to the electronic control unit 24 itself.

Finally, a pair of sensors 28 coupled to drive axles 12 detects in real time the speed of rotation $\omega 1$ and $\omega 2$ of the rear driving wheels 3; sensors 28 are connected in the known way to the electronic control unit 24 to communicate to the electronic control unit 24 itself the speed $\omega 1$ and $\omega 2$ of rotation of the rear wheels 3.

As shown in FIG. 3, a calculation unit 29 determines in real time a percentage % Ca of the motive torque to be transmitted to the front wheels 2, which is transmitted from the calculation unit 29 to a control block 30 which controls the solenoid valve 23 of the hydraulic actuator 22. In other words, the control block 30 controls the solenoid valve 23 of the hydraulic actuator 22 so that the clutch 17 transmits exactly the percentage % Ca of the motive torque established by the calculation unit 29 to the front wheels 2. According to different possible embodiments, the control block 30 may implement within an open loop or a closed loop control of the solenoid valve 23 of the hydraulic actuator 22.

The calculation unit 29 envisages to determine three different contributions % Ca1, % Ca2 and % Ca3, which are summed together in a summing block 31 to determine the percentage % Ca of motive torque to be transmitted to the front wheels 2.

The contribution % Ca1 is determined in closed loop by means of a feedback control chain 32 which uses as feedback variable the average speed of rotation $\omega m$ of the rear wheels 3; the average rotation speed $\omega m$ of the rear wheels 3 is determined by a calculation block 33 by a simple arithmetical average of the rotation speeds ω1 and ω2 of the rear wheels 3. The feedback control chain 32 envisages a calculation block 34, which uses the longitudinal speed Vx of car 1 provided with sensors 25 to determine a value of the reference speed of rotation ωrif of the rear wheels 3. In particular, the reference rotation speed ωrif of the rear wheels 3 is obtained by dividing the longitudinal speed Vx by the circumference of the rear wheels 3, i.e. by dividing the longitudinal speed Vx by a constant depending on the radius (or diameter) of the rear wheels 3.

In a differential block 35, the reference rotation speed ωrif of the rear wheels 3 is compared with the average rotation speed ωm of the rear wheels 3 to generate an error signal E proportional to the difference between the two values. The error signal E is initially processed by a saturation block 36, which outputs the maximum between 0 and the input error signal E; in other words, the saturation block 36 guarantees that the error signal E is never negative. From saturation block 36, the error signal E is transmitted by a PI (proportioning-integrative) regulator 37, which determines the contribution % Ca1.

Generally, the closed loop control chain 32 does not depend on the grip conditions of the road surface; a different calibration of parameters of the PI regulator 37 may be envisaged according to the grip conditions, in order to ensure constantly smooth intervention in the event of low grip (icy or snow-covered road).

The contribution % Ca2 is determined in open loop by an open loop control chain 38 which provides contribution % Ca2 according to some dynamic parameters of the car 1. The control chain 38 comprises a calculation block 39, which provides the contribution % Ca2 according to the longitudinal speed Vx of car 1, the longitudinal acceleration Ax of car 1, and the transversal acceleration Ay of car 1. Preferably, the calculation block 39 comprises a memory (not shown), in which three dimensional maps 40 are stored, which receive in input the longitudinal speed Vx, the longitudinal acceleration Ax, and the transversal acceleration Ay, and output the corresponding contribution % Ca2. The maps 40 are created so as to transfer motive torque to the front wheels 2 through clutch 17 when the combination of the dynamic parameters of the car 1 indicate that such transfer of motive torque increases traction control and/or stability of the car 1.

Normally, the transfer of motive torque to the front wheels 2 through clutch 17 is obtained only in drive conditions, i.e. when car 1 is accelerating (positive longitudinal acceleration Ax), and not when coasting, i.e. when car 1 is decelerating (negative longitudinal acceleration Ax); however, it may be decided to transfer motive torque to the front wheels 2 also in coasting conditions to stabilise car 1.

The splitting of motive force between the front and rear axles considerably affects handling of the car 1; in particular, it is observed that rear-wheel drive cars suffer from annoying understeering on narrow bends with low lateral acceleration and are affected by oversteering on fast bends with high lateral acceleration. The maps 40 are created so as to activate four-wheel drive when necessary, i.e. to transfer motive torque to the front wheels 2, in order to reduce, if not eliminate, these problems.

It will now be described by way of example two undesired behaviours typical of a rear-wheel drive car which aim to be eliminated by splitting the motive forced between the two axles:

on narrow bends at slow speed, the transfer of part of the motive torque to the front wheels 2 on one side reduces the thrust effect towards the outside of the bend generated by the rear driving wheels 3, and on the other hand introduces oversteering given by the projection in transversal direction of the longitudinal frontal forces;

when the car 1 is at high speed and subjected to a high lateral acceleration, the transfer of part of the motive force to the front wheels 2 implies a lower thrust towards the inside of the bend by the rear driving wheels 3 and therefore their less combined use, which translates into less oversteering tendency due to saturation of the rear axis and implies the combined use of the front wheels 2 which, kinematically introduces an oversteering moment given by the projection of the longitudinal forces in transversal direction, besides having the benefit of generating understeering.

From the above, it is therefore clear that the maps 40 will provide a contribution % Ca2 which is not null at low speeds and high lateral acceleration, and at high speed and high lateral acceleration.

Coasting on bends is particularly critical for the car 1 both from a purely dynamic point of view and in terms of the feeling of stability and safety transmitted to the driver. Above all, in limit conditions, when the high transversal acceleration implies important transfer of load to the outer wheels, the further transfer of load onto the front axis consequent to coasting may cause oversteering of the car 1. If this does not occur, the car 1 may, however, manifest strong oscillations in terms of yaw and considerable restriction of trajectory. All this is translated into a feeling of instability perceived by the driver. In this perspective, the clutch 17 may be of assistance in reducing the transient of car 1 and making the behaviour of car 1 more intuitive. The objectives of the maps 40 in such manoeuvres are the minimisation of yaw speed oscillations consequent to the coasting action on bends and the maximum reduction of trajectory restriction, compatible with kinematic links.

Preferably, the calculation block 39 performs interpolation operations of the known type to determine the contribution % Ca2 with greater accuracy. The maps 40 are analytically and experimentally created, i.e. are initially calculated in an analytic way by using behaviour models of the car 1 and then are experimentally fine-tuned. According to a preferred embodiment, maps 40 are bi-dimensional according to longitudinal speed Vx and transversal acceleration Ay and are parameterised according to longitudinal acceleration Ax. Furthermore, according to a preferred embodiment, three different mappings according to grip conditions are stored in calculation block 39; in other words, there are maps 40 for high grip conditions (dry road), maps 40 for medium grip conditions (wet road) and maps 40 for low grip conditions (flooded, icy or snow-covered road). In use, the grip condition is either manually determined by the driver by means of a selector (not shown), or it is automatically determined, for example exploiting a grip acknowledgment function which uses the ABS (brake anti-locking system), ESP (electronic stability control) and ASR (driving wheel anti-slip) signals. The calculation block 39 uses the specific map 40 according to the determined grip condition; it is important to stress that the number of maps 40 according to grip conditions may be other than three and it is generally from two to five.

The contribution % Ca3 is determined in open loop by means of an open loop control chain 41 which provides the contribution % Ca3 according both to the position Pgas of accelerator pedal 27 and the speed variation in time of the position Pgas of the accelerator pedal 27. The control chain 41 comprises a calculation block 42, which receives in input the position Pgas of the accelerator pedal 27 detected by the sensor 26 and the speed variation in time of the position Pgas of the accelerator pedal 27, i.e. the prime derivative in time of the position Pgas of the accelerator pedal 27. Preferably, the calculation block 42 comprises a memory (not shown), in which bi-dimensional maps 43 are stored, which receives as input the position Pgas of the accelerator pedal 27 and the speed variation in time of the position Pgas of the accelerator pedal 27 and outputs the corresponding contribution % Ca3. The maps 43 are analytically and experimentally created, i.e. are initially calculated in an analytic way by using behavioural models of the car 1 and then are experimentally fine-tuned. The maps 43 generally present a null contribution % Ca3 for low speed variations in time of the position Pgas of the accelerator pedal 27; in other words, the contribution % Ca3 is not null only in presence of a request for rapid increase of the motive torque generated by the engine 4. According to a different embodiment, the calculation block 42 also evaluates the state of the car 1 (longitudinal speed Vx, transversal acceleration Ay, and longitudinal acceleration Ax) to determine a contribution % Ca3 not null only in presence of an actual request for rapid increase of motive torque generated by the engine 4.

As mentioned above, the percentage % Ca of the motive torque to be transmitted to the front wheels 2 is determined by summing three different contributions % Ca1, % Ca2 and % Ca3. The main (i.e. numerically preponderant) contribution is contribution % Ca2, which is determined in open loop according to some dynamic parameters of the car 1. The contributions % Ca1 and % Ca3 have the purpose of correcting contribution % Ca2 during transients and are numerically reduced with respect to contribution % Ca2; by way of example, contribution % Ca2 may be comprised between 0 and 30-50% (the exact value depends on the features of car 1), while contributions % Ca1 and % Ca3 are generally comprised between 0 and 10-20%.

Contribution % Ca1 acts according to the slipping of the rear wheels 3, because it attempts to cancel the error signal E proportional to the difference between the average rotation speed ωm of the rear wheels 3 and the reference rotation ωrif of the rear wheels 3. In other words, in absence of slipping, the rotation reference ωrif of the rear wheels 3 is identical to the average rotation speed ωm of the rear wheels 3, while in the event of slipping of the rear wheels 3 the reference rotation ωrif of the rear wheels 3 is lower than the average rotation speed ωm of the rear wheels 3. Contribution % Ca1 is versatile, because it is not intended to work in a limited number of particular conditions, such as contribution % Ca1. For example, the closed loop control chain 32 is capable of determining contribution % Ca1 for managing start-off and/or loss of grip on straight conditions, by exploiting to the maximum the more loaded rear driving wheels 3 and by transferring motive torque to the less loaded front wheels 2 only when actual macro-slipping of the rear driving wheels 3 occurs. A further condition in which the closed loop control chain 32 can work efficiently occurs above all at medium and low grip when the driver suddenly demands plenty of motive torque starting from very low lateral acceleration levels.

Contribution % Ca3 is determined by an open loop according both to the position Pgas of the accelerator pedal 27, and the variation speed in time of position Pgas of the accelerator pedal 27. The object of contribution % Ca3 is to advance the effects of flooring of the accelerator pedal 27 (i.e. of sudden demand to rapidly increase motive torque generated by the engine 4) on the dynamics of the car 1 by increasing the motive torque transfer to the front wheels 2; in other words, if the driver floors the accelerator pedal 27, it is envisaged that a consequent increase of motive torque may make the rear wheels 3 slip and that such possible slipping of the rear wheels 3 is "corrected in advance" by increasing the motive torque transmitted to the front wheels 2. It is apparent that contribution % Ca3 may be determined by using the position of a throttle valve (not shown) of the engine 4 or another equivalent signal instead of the position Pgas of the accelerator pedal 27.

According to a preferred embodiment, downstream of the control block 30 an interdiction block 44 is arranged, whose function is to prevent the clutch 17 from closing when a gear higher than third gear is engaged by gearbox 10; in particular, such result may be easily obtained by imposing that when the gear engaged by the gearbox 10 is higher than third gear, the percentage % Ca of motive torque to be transmitted to the front wheels 2 is always null. The presence of interdiction block 44 (or other element having the same function) is required because clutch 17 may transmit motive torque to the front wheels 2 only when the input of clutch 17 presents an angular speed higher than or equal to the output of clutch 17; when a gear higher than third gear is engaged, the output of clutch 17 turns faster than the input of clutch 17 and consequently no motive torque can be transmitted through clutch 17 itself to the front wheels 2.

According to a different embodiment, not shown, the percentage % Ca of motive torque to be transmitted to the front wheels 2 is determined by using only one or two of the three different contributions % Ca1, % Ca2 and % Ca3 described above.

The description of clutch 17 in different running conditions of car 1 is described below.

When car 1 is running, in absence of critical dynamic parameters (longitudinal speed Vx, longitudinal acceleration Ax, transversal acceleration Ay) and in absence of slipping of the rear wheels 3, the percentage % Ca of motive torque to be transmitted to the front wheels 2 is null. In this situation, the pressure P of the oil within the hydraulic actuator 22 is also null and therefore the clutch 17 does not transmit any torque from its input to its output; it therefore results that that entire motive torque generated by engine 4 is relieved to the ground by the rear wheels 3, while the front wheels 2 are driven by effect of the advancement of the car 1.

When car 1 is running, if slipping of the rear wheels 3 occurs by effect of a loss of grip of the rear wheels 3 themselves and/or critical dynamic parameters (longitudinal speed Vx, longitudinal accelerator Ax, transversal acceleration Ay) occur, the percentage % Ca of motive torque to be transmitted to the front wheels 2 is still positive. In this situation, the pressure P of the oil within the hydraulic actuator 22 is not null, therefore the clutch 17 transmits a torque from its input to its output towards the front differential 19 of the front wheels 2; it therefore results that the motive torque generated by the engine 4 is relieved to the ground partially by the rear wheels 3 and partially by the front wheels 2. Obviously, the maximum torque which is transmitted to the front wheels 2 can be limited so as not to exceed a predetermined threshold, which may be either constant or variable.

It is important to stress that if third gear is engaged by gearbox 10, the input and the output of clutch present the same angular speed and therefore the plates of the clutch 17 reciprocally and synchronously turn, while if first or second gear is engaged by the gearbox 10, the input of clutch 17 presents a higher angular speed with respect to the output of clutch 17 and therefore there is a only a relative slipping between the plates of clutch 17. In other words, if first or second gear is engaged by the gearbox 10, the clutch 17 adapts the speed of rotation by reducing the rotation speed determined by the gear chain 16 (note that, as mentioned above, the transmission ratio of the gear chain 16 corresponds exactly to the transmission ratio which is determined by the third gear of the gearbox 10).

Conversely, if slipping of the rear wheels 3 occurs when the gear engaged by the gearbox 10 is higher than third gear, the clutch 17 is not closed because the clutch 7 itself cannot transmit motive torque to the front wheels 2 if the output of clutch 17 turns faster than the input of clutch 17.

From the above, it is apparent that traction is normally entrusted only to the rear wheels 3 and is automatically split for short periods also to the front wheels 2 only when needed; it is important to stress that traction may be split also to the front wheels 2 only for short periods, because when adapting speed (first or second gear engaged by the gearbox 10), the oil within clutch 17 tends to rapidly warm up and therefore the clutch 17 itself is not capable of operating correctly for prolonged periods of time (indicatively longer than 10-30 seconds).

According to an embodiment shown by a dotted line in FIG. 2, clutch 17 is provided with a radiator for cooling oil. The radiator 45 may be of the oil/air type, i.e. the oil circulating within the radiator 45 is cooled by the external air, of the oil/water type, i.e. the oil circulating within the radiator 45 is cooled by a cooling liquid of the engine 4, or oil/oil, i.e. the oil circulating within the radiator 45 is cooled by a further cooling oil.

The radiator 45 may be provided with a cooling device 46, which is operated to increase the heat exchange of the radiator 45, i.e. to increase the cooling capacity of the radiator 45. Typically, the cooling device 46 is defined by a fan controlled by a thermostat, i.e. by a temperature sensor which determines the oil temperature; alternatively, the cooling device 46 may vary the flow of air conveyed through the radiator 45 by varying the position and/or the dimensions of an air vent (not shown).

According to a possible embodiment shown by a dotted line, clutch 17 is provided with a temperature sensor 47, which detects the oil temperature in clutch 17. The oil temperature in clutch 17 determined by the temperature sensor 47 may be used either to control the cooling device 46, or to limit the use of clutch 17; i.e. clutch 17 will be used only if the oil temperature within is lower than a determined threshold so as to avoid excessive overheating of the oil itself. Several oil temperature thresholds of clutch 17 may be envisaged so as to determine a gradual limitation of the use of clutch 17.

According to a different embodiment (not shown), the clutch 8 is arranged on the rear axle and is accommodated within a bell integral with the gearbox 10. According to a further embodiment (not shown), the clutch 8 is arranged on the rear axle, is accommodated in a bell integral with the gearbox 10 and is a double clutch.

Figure 4:
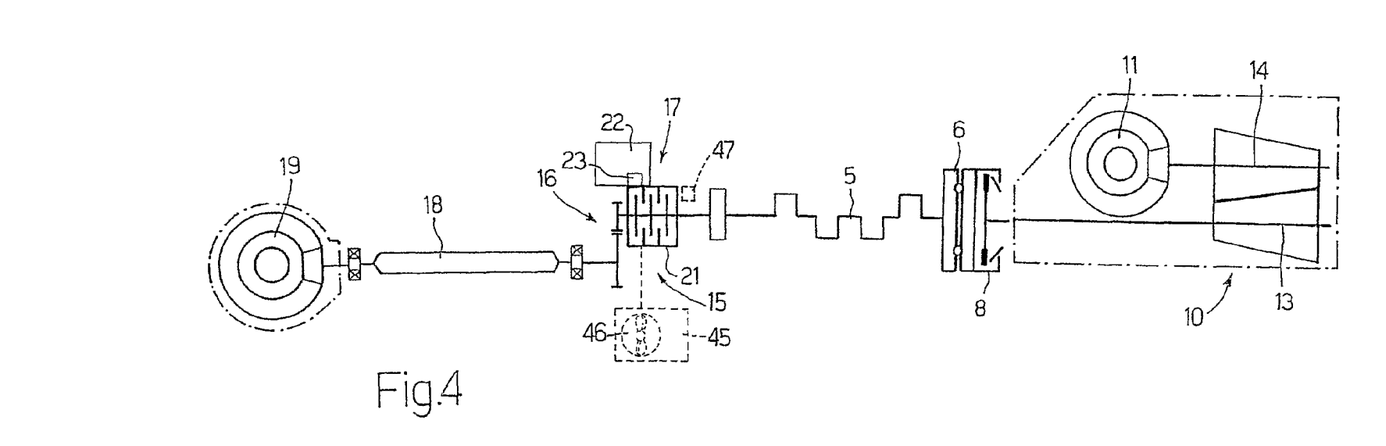
FIG. 4 shows a functional diagram of the transmission of motion to the driving wheels according to an alternative embodiment of an insertable four-wheel drive motor vehicle according to the present invention.
Figure 6:
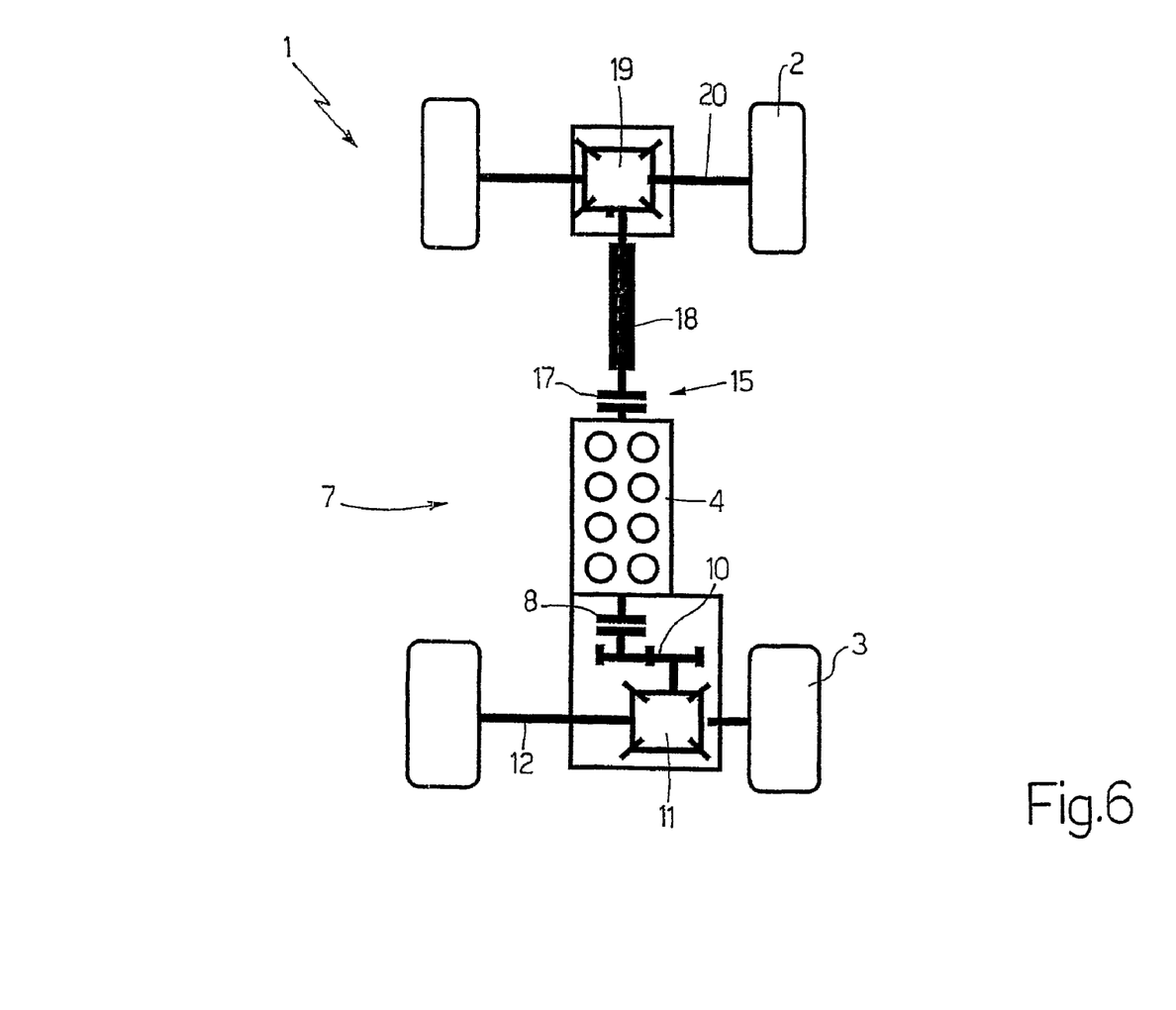
FIG. 6 shows a different graphic representation of the functional diagram of transmission of motion to the driving wheels in FIG. 4.

According to the embodiment shown in FIGS. 4 and 6, the engine 4 is arranged in essentially central position with clutch 8 and gearbox 10 arranged on the rear axle. On one end the crankshaft 5 is mechanically connected to the flywheel 6 and to the clutch 8, and on the other end it is directly connected to clutch 17, which is also arranged in essentially central position. Downstream of the clutch 17, in essentially central position the gear chain 16 is arranged, from which departs the propeller shaft 18 which connects to the front differential 19, also arranged in frontal position. From a functional point of view, the embodiment shown in FIGS. 4 and 6 is identical to the embodiment shown in FIGS. 1, 2 and 5; the peculiarity of the embodiment shown in FIG. 4 is the arrangement of the mechanical elements and in particular the fact that the crankshaft 5 on one end transmits the motion to the front wheels 2 and on the opposite end transmits motion to the rear wheels 3.

Figure 7:
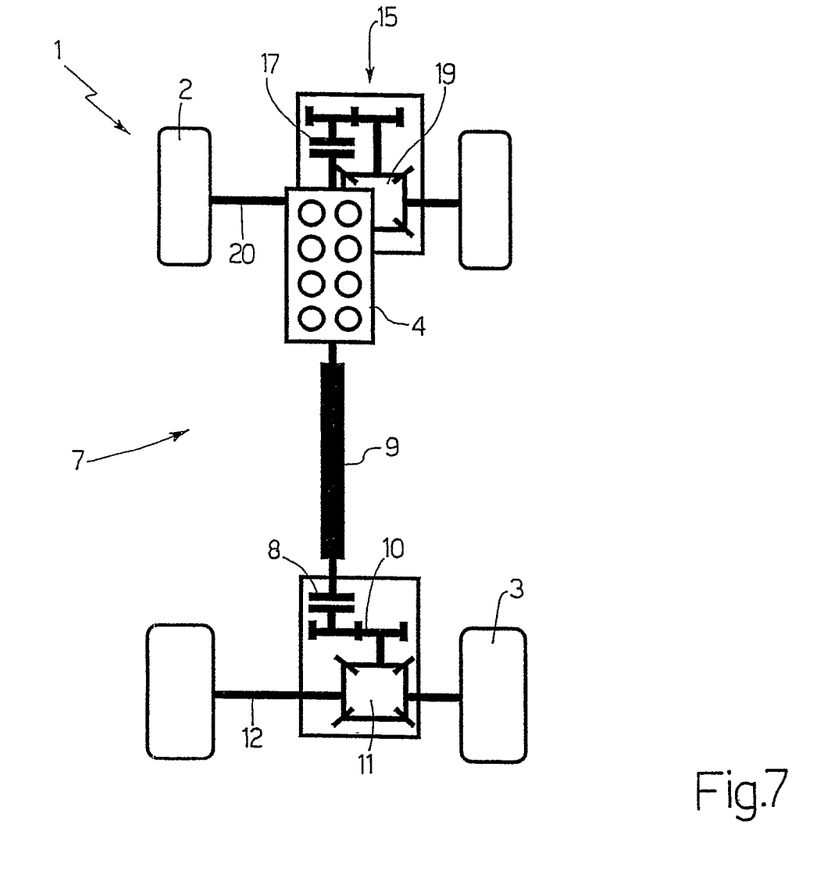
FIG. 7 shows a variant of the functional diagram of transmission of motion to the driving wheels in FIG. 2.

FIG. 7 shows a further embodiment, which combines the front position of the engine 4 in the embodiment in FIGS. 1, 2 and 5 and the arrangement of the mechanical elements of the embodiment in FIGS. 4 and 6, in which the crankshaft 5 on one end transmits motion to the front wheels 2 and on the opposite end transmits motion to the rear wheels 3.

Experimental tests have shown that the insertable transmission system 15 described above allows the driver to drive the car 1 in the best traction conditions in all grip situations and without requiring any intervention by the driver. Furthermore, the insertable transmission system 15 described above is simple to implement, presents contained dimensions and weights and does not entail considerable loss of motive torque when traction is only on the rear wheels 3. Finally, the insertable transmission system 15 described above allows to increase the performance, stability and traction control in all conditions of grip.

The invention claimed is:

1. An insertable four-wheel drive motor vehicle, comprising:
    an engine including a crankshaft;
    a pair of main driving wheels permanently connected to the crankshaft by interposition of a gearbox provided with at least one first clutch;
    a pair of secondary driving wheels;
    an insertable transmission system, which is adapted to connect the crankshaft also to the secondary driving wheels and comprises a second controllable clutch for transmitting a variable torque from zero to a maximum value; the second clutch on one end is mechanically connected directly to the crankshaft upstream of the gearbox and of the first clutch and on another end is mechanically connected to the secondary driving wheels;
    an electronic control unit for controlling the insertable transmission system by controlling actuation of the second clutch; and
    a number of first sensors, which are connected to the electronic control unit and detect a number of dynamic parameters of the motor vehicle,
    wherein the electronic control unit determines a percentage of motive torque to be transmitted to the secondary driving wheels according to the dynamic parameters of the motor vehicle detected by the first sensors.

2. A motor vehicle according to claim 1, wherein the second clutch is connected on the one end with a first fixed transmission ratio to the crankshaft upstream of the gearbox and on the another end is connected with a second fixed transmission ratio to the second driving wheels.

3. A motor vehicle according to claim 1, wherein the gearbox comprises a plurality of gears; the insertable transmission system comprising a gear chain, which presents a transmission ratio so that when a certain synchronism gear is engaged by the gearbox, the input and the output of the second clutch present a same speed.

4. A motor vehicle according to claim 1, wherein the dynamic parameters of the motor vehicle detected by the first sensors comprise longitudinal speed of the motor vehicle, longitudinal acceleration of the motor vehicle, and transversal acceleration of the motor vehicle.

5. A motor vehicle according to claim 1, wherein the electronic control unit activates the insertable transmission system to transfer motive torque to the secondary driving wheels through the second clutch only in drive conditions.

6. A motor vehicle according to claim 1, wherein the electronic control unit activates the insertable transmission system to transfer motive torque to the secondary driving wheels through the second clutch both in drive conditions and in coasting conditions.

7. A motor vehicle according to claim 1, wherein the electronic control unit determines the percentage of motive torque to be transmitted to the secondary driving wheels in closed loop by a first feedback control chain that uses average speed of rotation of the main driving wheels as a feedback variable.

8. A motor vehicle according to claim 7, wherein the first control chain determines a value of the reference speed of rotation of the main driving wheels according to a longitudinal speed of the motor vehicle.

9. A motor vehicle according to claim 7, wherein the first control chain comprises a proportioning-integrative regulator.

10. A motor vehicle according to claim 1, wherein the electronic control unit determines the percentage of motive torque to be transmitted to the secondary driving wheels by an open loop control chain.

11. A motor vehicle according to claim 10, wherein the second control chain comprises a first calculation block, which provides the percentage of motive torque to be transmitted to the secondary driving wheels according to dynamic parameters of the motor vehicle; the first calculation block comprises a first memory, in which first maps are stored, which receives as an input the dynamic parameters of the motor vehicle and outputs a corresponding percentage of motive torque to be transmitted to the secondary driving wheels.

12. A motor vehicle according to claim 11, wherein the first memory of the first calculation block comprises a series of first maps, each of which is optimized for a respective grip condition.

13. A motor vehicle according to claim 1, wherein the electronic control unit determines the percentage of motive torque to be transmitted to the secondary driving wheels by an open loop control chain, which comprises a second calculation block that provides the percentage of motive torque to be transmitted to the secondary driving wheels according to a position of a control of an accelerator and according to a variation speed in time of the position of the accelerator control.

14. A motor vehicle according to claim 13, wherein the second calculation block comprises a second memory, in which second bi-dimensional maps are stored, which receives as an input a position of the accelerator control and the variation speed in time of the position of the accelerator control and outputs the percentage of motive torque to be transmitted to the secondary driving wheels.

15. A motor vehicle according to claim 13, wherein the second calculation block determines a null percentage of motive torque to be transmitted to the secondary driving wheels at low speed variations in time of the position of the accelerator control.

16. A motor vehicle according to claim 1, wherein the electronic control unit determines the percentage of motive torque to be transmitted to the secondary driving wheels by summing a first contribution and a second contribution; the electronic control unit determines a first closed loop contribution by a first feedback control chain that uses an average speed of rotation of the main driving wheels as a feedback variable; the electronic control unit determines the second contribution by a second open loop control chain.

17. A motor vehicle according to claim 16, wherein the first control chain determines a value of reference speed of rotation of the main driving wheels according to a longitudinal speed of the motor vehicle.

18. A motor vehicle according to claim 16, wherein the first control chain comprises a proportioning-integrative regulator.

19. A motor vehicle according to claim 16, wherein the second control chain comprises a first calculation block, which provides the percentage of motive torque to be transmitted to the secondary driving wheels according to dynamic parameters of the motor vehicle; the first calculation block comprises a first memory, in which first maps are stored, which receives as an input the dynamic parameters of the motor vehicle and outputs a corresponding percentage of motive torque to be transmitted to the secondary driving wheels.

20. A motor vehicle according to claim 19, wherein the first memory of the first calculation block comprises a series of first maps, each of which is optimized for a respective grip condition.

21. A motor vehicle according to claim 1, wherein the electronic control unit determines the percentage of motive torque to be transmitted to the secondary driving wheels by summing a first contribution, a second contribution, and a third contribution; the electronic control unit determines a first closed loop contribution by a first feedback control chain that uses an average speed of rotation of the main driving wheels as a feedback variable; the electronic control unit determines the second contribution by a second open loop control chain; the electronic control unit determines the third contribution by a third open loop control chain, which comprises a second calculation block that provides the percentage of motive torque to be transmitted to the secondary driving wheels according to a position of an accelerator control and according to a variation speed in time of the position of the accelerator control.

22. A motor vehicle according to claim 21, wherein the first control chain determines a value of the reference speed of rotation of the main driving wheels according to a longitudinal speed of the motor vehicle.

23. A motor vehicle according to claim 21, wherein the first control chain comprises a proportioning-integrative regulator.

24. A motor vehicle according to claim 21, wherein the second control chain comprises a first calculation block, which provides the percentage of motive torque to be transmitted to the secondary driving wheels according to dynamic parameters of the motor vehicle; the first calculation block comprises a first memory, in which first maps are stored, which receives as an input the dynamic parameters of the motor vehicle and outputs a corresponding percentage of motive torque to be transmitted to the secondary driving wheels.

25. A motor vehicle according to claim 24, wherein the first memory of the first calculation block comprises a series of first maps, each of which is optimized for a respective grip condition.

26. A motor vehicle according to claim 21, wherein the second calculation block comprises a second memory, in which second bi-dimensional maps are stored, which receives as an input the position of the accelerator control and a variation speed in time of the position of the accelerator control and outputs the percentage of motive torque to be transmitted to the secondary driving wheels.

27. A motor vehicle according to claim 26, wherein the second calculation block determines a null percentage of motive torque to be transmitted to the secondary driving wheels at low speed variations in time of the position of the accelerator control.

28. A motor vehicle according to claim 1, wherein the second clutch is wet.

29. A motor vehicle according to claim 28, wherein the second clutch comprises a radiator for cooling oil.

30. A motor vehicle according to claim 29, wherein the radiator comprises a cooling device, which is operated to increase heat exchange carried out by the radiator and is controlled according to oil temperature.

31. A motor vehicle according to claim 30, wherein the second clutch comprises a temperature sensor, which detects the oil temperature of the second clutch; the electronic control unit limits use of the second clutch according to the oil temperature in the second clutch itself.

32. A motor vehicle according to claim 30, wherein the electronic control unit does not use the second clutch if the oil temperature in the second clutch itself is higher than a determined threshold.

33. A motor vehicle according to claim 1, wherein the gearbox comprises a plurality of gears; the insertable transmission system comprising a gear chain, which presents a transmission ratio so that when a synchronism gear is engaged by the gearbox input and the output of the second clutch present a same speed; the electronic control unit comprising an interdiction block configured to prevent activation of the second clutch when the gear engaged by the gearbox is higher than the synchronism gear.

34. A motor vehicle according to claim 1, wherein the main driving wheels are rear wheels and the secondary driving wheels are front wheels.

35. A motor vehicle according to claim 34, wherein the engine is arranged in a frontal position and is connected to the main driving wheels through a drive line comprising the first clutch and a first propeller shaft ending in the gearbox arranged on the rear axle; the gearbox is connected to a differential, from which depart a pair of drive axles, each of which is integral with a respective rear driving wheel.

36. A motor vehicle according to claim 34, wherein the engine is arranged in a central position; and the first clutch and the gearbox are arranged on a rear axle.

37. A motor vehicle according to claim 36, wherein the crankshaft is connected on one end to the first clutch to transmit motion to the main driving wheels and on another end is connected to the second clutch to transmit motion to the second driving wheels.

* * * * *